(12) United States Patent
Lomax et al.

(10) Patent No.: US 9,034,084 B2
(45) Date of Patent: May 19, 2015

(54) APPARATUS FOR DISTRIBUTING FLOW

(71) Applicant: Lummus Technology Inc., Bloomfield, NJ (US)

(72) Inventors: Franklin D. Lomax, Bloomfield, NJ (US); Jonathan Levy, Bloomfield, NJ (US); Chris Ebeling, Bloomfield, NJ (US); Richard S. Todd, Bloomfield, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 153 days.

(21) Appl. No.: 13/851,708

(22) Filed: Mar. 27, 2013

(65) Prior Publication Data

US 2014/0290492 A1    Oct. 2, 2014

(51) Int. Cl.
*B01D 53/04* (2006.01)
*F15D 1/02* (2006.01)

(52) U.S. Cl.
CPC .......................................... *F15D 1/02* (2013.01)

(58) Field of Classification Search
USPC ............ 96/108, 121, 139, 152; 422/177–179, 422/636
See application file for complete search history.

(56) References Cited

U.S. PATENT DOCUMENTS

| | | | | |
|---|---|---|---|---|
| 3,320,728 | A | * | 5/1967 | Spencer et al. .................. 96/133 |
| 3,363,843 | A | * | 1/1968 | Ballard et al. ................. 239/504 |
| 3,479,146 | A | * | 11/1969 | Hochman et al. ............. 422/220 |
| 5,098,690 | A | * | 3/1992 | Koves ........................... 423/659 |
| 5,234,582 | A | * | 8/1993 | Savoie ........................... 210/163 |
| 5,298,226 | A | | 3/1994 | Nowobilski |
| 5,538,544 | A | * | 7/1996 | Nowobilski et al. ............ 96/152 |
| 5,779,773 | A | * | 7/1998 | Cam et al. ....................... 96/152 |
| 5,873,929 | A | * | 2/1999 | Andreani et al. ................ 96/108 |
| 6,755,895 | B2 | | 6/2004 | Lomax, Jr. et al. |
| 6,858,065 | B2 | | 2/2005 | Lomax, Jr. |
| 7,491,259 | B2 | * | 2/2009 | Buchelli et al. .................... 95/90 |
| 7,674,319 | B2 | | 3/2010 | Lomax, Jr. et al. |
| 2003/0056649 | A1 | * | 3/2003 | Lee et al. .......................... 95/90 |
| 2005/0155492 | A1 | * | 7/2005 | Baksh et al. .................... 96/135 |
| 2013/0042754 | A1 | | 2/2013 | Lomax et al. |

FOREIGN PATENT DOCUMENTS

| | | |
|---|---|---|
| CN | 101648103 A | 2/2010 |
| CN | 201632182 U | 11/2010 |
| CN | 202724971 U | 2/2013 |

OTHER PUBLICATIONS

International Search Report and Written Opinion issued Aug. 19, 2014 in corresponding PCT Application No. PCT/US2014/031652 (10 pages).

* cited by examiner

*Primary Examiner* — Frank Lawrence
(74) *Attorney, Agent, or Firm* — Osha • Liang LLP

(57) ABSTRACT

Embodiments herein relate generally to distribution of flow into vessels containing packed beds of media. An example application of such beds is to pressure swing or temperature swing adsorption systems. Systems herein may include a vessel and a distributor for distributing flow into a lower portion of the vessel. The system may include: a vessel comprising a top head and a bottom head; and a bottom head feed/effluent nozzle. A lower distributor having at least one flow permitting surface is disposed within the vessel and encompasses an inlet of the bottom head feed/effluent nozzle. A flow gap is formed between a bottom portion of the lower distributor and the bottom head feed/effluent nozzle.

35 Claims, 7 Drawing Sheets

APPARATUS FOR DISTRIBUTING FLOW

FIELD OF THE DISCLOSURE

Embodiments disclosed herein relate generally to devices for distributing flow into a vessel. More specifically, embodiments disclosed herein relate to apparatus for distributing flow in a pressure swing or temperature swing adsorption system.

BACKGROUND

Pressure Swing Adsorption (PSA) is a technique used to fractionate mixtures of gases to provide at least one purified product gas and a raffinate byproduct mixture. PSA has been successfully used to separate hydrogen from other gases, oxygen and nitrogen from air, and helium from natural gas, among others.

PSA systems may include multiple vessels containing adsorbents to separate the gases. The vessels may include upper and lower heads through which flow conduits or nozzles are disposed.

During the PSA process, adsorption vessels undergo various stages of a cyclic process including feed, pressure equalization, product pressurization, counter-current blowdown, and purge, among others. Flow during the cyclic process includes flow of gases that traverses upward through the adsorbent bed(s) as well as downward through the adsorbent bed(s). Flow during the cyclic process also goes through rapid pressure and/or temperature swings; for example, flow at a vessel nozzle may be high pressure in one direction followed by low pressure in the opposite direction.

To prevent loss of the adsorbent through the nozzle(s) in the upper and lower heads of the adsorption vessel, screens or other devices have been used. One example of a prior screen includes a system of welded metal bars arranged in a "basket" shape. As another example, steel plates welded to the pressure shell in a conical or cylindrical shape with perforations or passages cut to permit flow. Additionally, trays covered by wire mesh with a large dead space below the tray have been used. These and other various designs may impart stresses to the adsorption vessel, may erode or corrode, such as due to liquids accumulation and imperfections due to welding, among others. In some instances, the stiff flow distribution apparatus have created high localized bending stresses, which have resulted in cracking of the adsorption vessel. This problem of bending restraint is particularly-pronounced in systems processing embrittling fluids, such as mixtures containing hydrogen, hydrogen sulfide, hydrogen cyanide, and ammonia, among others. Further, the various designs may be impractical or difficult to replace once the vessel is installed in the field. This further limitation is particularly-deleterious in designs which lack compressive strength to deal with high momentary pressure gradients, as may occur due to clogged fine screens within the distributor, clogged beaded packed bed media adjacent to the distributor, to abrupt failure of valves or piping attached to the vessel, or to combinations of these causes. It is particularly vexing that distribution means which are sufficiently stiff to resist collapse, such as those welded to the inner surface of the domed end cover, referred to as a head in the pressure vessel art, of the adsorption vessel are also particularly-inclined to give rise to localized bending stresses, which can give rise to cracks not only in the flow distribution apparatus, but also in the primary pressure-retaining surfaces of the pressure vessel—i.e. the heads or shell. Such cracks disadvantageously permit leaks, which may pose significant safety risks if the fluid being treated poses risks due to flammability, toxicity or asphyxiation, among other exemplary risks.

SUMMARY OF THE CLAIMED EMBODIMENTS

In one aspect, embodiments disclosed herein relate to a system including a vessel and a distributor for distributing flow into a lower portion of the vessel. The system may include: a vessel comprising a top head and a bottom head; and a bottom head feed/effluent nozzle. A lower distributor having at least one flow permitting surface is disposed within the vessel and encompasses an inlet of the bottom head feed/effluent nozzle. A flow gap is formed between a bottom portion of the lower distributor and the bottom head feed/effluent nozzle.

In some embodiments, the lower distributor is disposed within the vessel to provide the flow gap having dimensions sufficient to permit a liquid to drain from the vessel into the bottom head feed/effluent nozzle and to retain a solid medium, such as an adsorbent or a catalyst, disposed within the vessel proximate the lower distributor.

In some embodiments, the at least one flow permitting surface is configured to distribute at least a portion of a flow of gases in a direction normal to an axis of the bottom head feed/effluent nozzle. The at least one flow permitting surface may be configured to distribute at least a portion of a flow of gases in a direction parallel to the axis of the bottom head feed/effluent nozzle.

The lower distributor may also include at least one structural support fins configured to extend below a lowermost edge of the flow permitting surface nearest a bottom head feed/effluent nozzle aperture. In some embodiments, the structural support fin is attached, such as removably attached, to the bottom head feed/effluent nozzle.

The lower distributor, in some embodiments, is configured to provide 75% to 100% of a mass flow normal to an axis of the bottom head feed/effluent nozzle, and from 0% to 25% of the mass flow parallel to the axis of the bottom head feed/effluent nozzle. In other embodiments, the lower distributor is disposed within the vessel and configured to provide from 75% to 95% of the mass flow through the at least one flow permitting surface and from 5% to 25% of the mass flow through the flow gap.

The system may also include a top head feed/effluent nozzle; and an upper distributor disposed in the vessel proximate the top head feed/effluent nozzle. The upper distributor may include a flow conduit in fluid communication with the top head feed/effluent nozzle comprising one or more flow permitting features configured to distribute at least a portion of a flow of gases in a direction normal to an axis of the top head feed/effluent nozzle.

In another aspect, embodiments disclosed herein relate to a pressure swing or temperature swing adsorption system. The system may include: a vessel comprising a top head and a bottom head; a bottom head feed/effluent nozzle; an adsorption medium disposed in the vessel; a lower distributor disposed within the vessel and encompassing an inlet of the bottom head feed/effluent nozzle. The lower distributor may include: at least one flow permitting surface; and at least one structural support fin removably attached to the bottom head feed/effluent nozzle.

The structural support fins may be configured to extend below a lowermost portion of the flow permitting surface nearest a bottom head feed/effluent nozzle aperture into the bottom head feed/effluent nozzle and to centralize the lower distributor with respect to the bottom head feed/effluent nozzle. A top of the structural support fins may also provide structural support to the at least one flow permitting surface.

In some embodiments, the lower distributor comprises: two or more perforated plate sections, the perforated plate sections including a top flanged section, a bottom flanged section, and two vertical flanged sections defining a periphery of a vertical section; and an upper perforated plate section connected to the top flanged section of the two or more perforated plate sections. A diameter of perforations of the two or more perforated plate sections and the horizontal perforated plate section may be less than a diameter of the adsorption medium.

The structural support fins may be configured to extend below the bottom flanged sections into the bottom head feed/effluent nozzle and to centralize the lower distributor with respect to the bottom head feed/effluent nozzle. The structural support fins may also be configured to distribute a load from the distributor to the vessel and/or the feed/effluent nozzle. A top of the structural support fins may also provide structural support to the upper perforated plate section.

In some embodiments, the system includes a flow gap between the bottom flanged sections of the two or more perforated plate sections and an inner surface of the bottom head of the vessel. Dimensions of the flow gap between the bottom head and the lower distributor may be configured to retain the adsorption medium in the vessel and provide flow area for liquid to drain from the vessel through the bottom head feed/effluent nozzle.

In some embodiments, the lower distributor is configured to provide: from 0% to 25% of a mass flow through the horizontal perforated plate section; from 50% to 95% of the mass flow through the vertical section; and from 5% to 25% of the mass flow through the gap; wherein the ranges add up to 100%, based on total mass flow passing from the bottom head feed/effluent nozzle to an interior of the vessel for contact with the adsorption medium or vice versa. The lower distributor may be configured to provide flow in the vessel having a uniformity index of at least 0.9 within 5 bottom head feed/effluent nozzle inner diameters downstream of the nozzle in some embodiments. The lower distributor may be configured to provide 75% to 99% of a mass flow normal to an axis of the bottom head feed/effluent nozzle, and from 1% to 25% of the mass flow parallel to the axis of the bottom head feed/effluent nozzle in other embodiments.

The system may also include: a top head feed/effluent nozzle; and an upper distributor disposed in the vessel proximate the top head feed/effluent nozzle. The upper distributor may include a flow conduit in fluid communication with the top head feed/effluent nozzle comprising one or more flow permitting features configured to distribute at least a portion of a flow of gases in a direction normal to an axis of the top head feed/effluent nozzle. The upper distributor may also include a lower cap section that comprises one or more perforations to permit liquid to drain from the upper distributor into the vessel.

In another aspect, embodiments disclosed herein relate to a distributor for use in a lower head of a vessel. The distributor may include: at least one flow permitting surface; and at least one structural support fin configured to provide structural support to the at least one flow permitting surface, to transfer load from the distributor to a vessel nozzle in which the distributor is disposed, and to removably attach to the vessel nozzle.

In another aspect, embodiments disclosed herein relate to a distributor for use in a lower head of a vessel. The distributor may include: two or more perforated plate sections, the perforated plate sections including a top flanged section, a bottom flanged section, and two vertical flanged sections defining a periphery of a vertical section; an upper perforated plate section connected to the top flanged section of the two or more perforated plate sections.

The distributor may also include a structural support fin disposed between the connected vertical flanged sections. The structural support fins may be configured to extend below the bottom flanged sections into a bottom head feed/effluent nozzle of a vessel and to centralize the lower distributor with respect to the bottom head feed/effluent nozzle. A top of the structural support fins may provide structural support to the upper perforated plate section.

In another aspect, embodiments disclosed herein relate to a distributor for use in distributing flow into a vessel. The distributor may include: a vertical section including one or more apertures permitting flow through the distributor; an upper plate section connected to the vertical section including one or more apertures permitting flow through the distributor; one or more structural support fins connected to the vertical section and the upper plate section, the structural support fins configured to provide structural support to the distributor and to transfer load from the distributor to a vessel nozzle in which the distributor is disposed.

In another aspect, embodiments disclosed herein relate to a vessel. The vessel may include: a bottom head having a flow aperture and a nozzle encompassing the aperture; wherein the nozzle slopes toward the aperture to permit liquid to drain freely from the vessel.

Other aspects and advantages will be apparent from the following description and the appended claims.

BRIEF DESCRIPTION OF DRAWINGS

FIG. 3 also presents Computational Fluid Dynamics (CFD) analyses results of fluid flow through the top portion of the distributor apparatus.

DETAILED DESCRIPTION

Embodiments disclosed herein relate generally distribution of flow into vessels containing packed beds of media. An example application of such beds is to pressure swing or temperature swing adsorption systems. More specifically, embodiments disclosed herein relate to apparatus for distributing flow in a pressure swing or temperature swing adsorption system, and pressure swing or temperature swing adsorption systems incorporating such apparatus.

Figure 1:
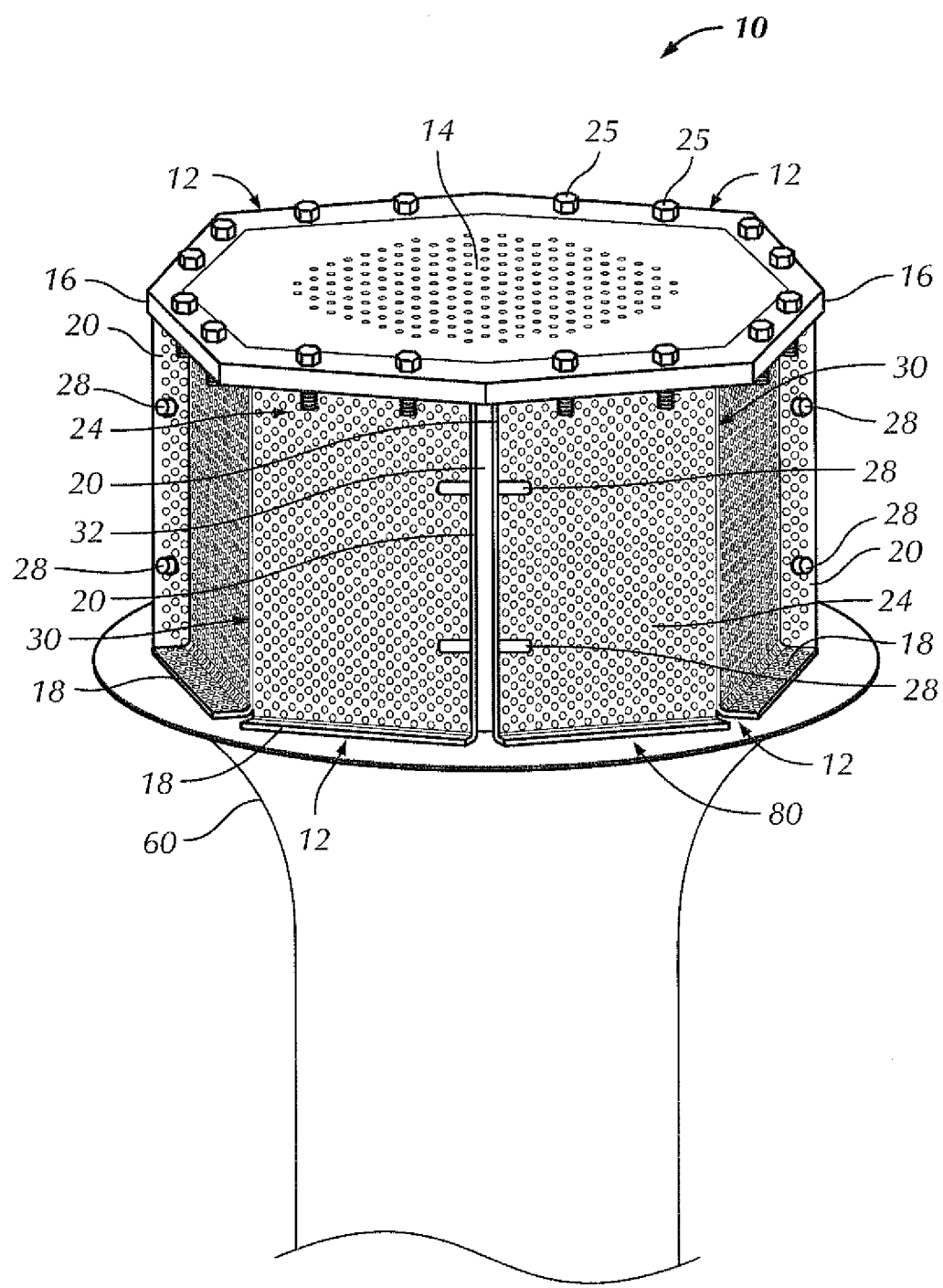
FIG. 1 is an isometric view of a distributor apparatus according to embodiments disclosed herein.

Referring now to FIG. 1, a distributor for use in distributing flow from or to an aperture or nozzle through the pressure boundary of the pressure vessel which is smaller in a major size, such as diameter, than the pressure vessel itself is illustrated. The distributor 10 includes at least one surface for permitting flow into and/or out of the vessel, with which the distributor, 10 may cause the flow to be distributed within the vessel in a uniform manner. This at least on surface is provided with the ability to distribute flow both parallel to the axis of the aperture and perpendicular to that axis. The surface need not be continuously permissive of flow, and flow permitting regions may be arrayed to provide rapid dispersion of the fluid in a manner which suits the geometry and flow resistance characteristics of the vessel and nozzle system. For simplicity, an embodiment in which the nozzle is circular and the vessel is cylindrical is shown, although other combinations are possible. For further simplification, the distributor 10 in FIG. 1 is provided with one flow permitting surface which is parallel to the flow through the nozzle and one which is perpendicular. It is not necessary that these surfaces be orthogonal as shown in FIG. 1, nor that there be only two surfaces, as shown. In the embodiment described by FIG. 1, the surface perpendicular to the axis of the nozzle has at least one flow permitting section 12. Likewise, the surface perpendicular to the axis of the nozzle has at least one section 14.

With regard to the flow permitting regions, one embodiment uses perforated plates, while other embodiments might use an array of welded or brazed bars, woven wire in one or more layers, porous polymer, or porous metal foam or sintered powdered metal. The flow permitting features should be smaller in their characteristic dimension that the particles in the packed bed within the associated vessel. The flow permitting features may also be chosen to be smaller than a critical sized particle which may be attrited off of the packed bed media and may damage upstream or downstream equipment. The smallness may be achieved by a single layer, or by a composite structure, for instance perforated media which is very stiff, covered my some other media such as wire cloth, which is not.

In FIG. 1, the means of permitting flow are holes in a planar material, such as those formed by punching, drilling, or cutting via jets of laser light, water, etc. in sheet stock. The dimension of the holes may be chosen to be smaller than the dimension of the packed media within the vessel. Alternatively, the holes may be chosen to be smaller than a critical particle size that could damage upstream or downstream equipment, such as valves, compressors, etc. The choice of the size of the holes is application-dependent. Alternative flow permitting surfaces are applicable as well, such as sintered metal powder, metal foams, woven or non-woven metal meshes, foams or screens, porous polymers, etc. The flow permitting media may also be a composite, or hybrid, made up of a combination of these materials.

In some embodiments, the upper perforated plate section 14 may be a flat perforated plate, such as illustrated in FIG. 1. In other embodiments, the upper perforated plate section may be formed from one or more conical, spherical or elliptical sections, whereas such shapes may advantageously increase the stiffness of the distributor apparatus against collapse due to applied loads due to static or dynamic fluid pressure or gravity. Naturally, the at least one flow permitting surface may also be formed in one piece, such as by spinning, deep drawing, machining, plasma spraying, hot isostatic pressing, etc. Such a single surface may be arcuate, prismatic, or other shapes, examples of which could be comparable in shape to a bowl, or pot.

An important attribute of the flow distributor 10 is that it is subject to one or more mechanical loads, such as those due to static fluid pressure, dynamic fluid pressure, thermal or pressure-induced external strains due to its attachment to the pressure vessel, and gravity forces due to the weight of the packed media placed within the vessel. These loads may act individually, or separately. They may be uniform, or localized. The combined action of such loads may potentially cause mechanical collapse of the flow permitting surface.

In order to prevent mechanical failure, the flow permissive surface must resist uniformly-distributed or point loads. If the loads are applied from the face of the surface which faces the vessel, the resultant stresses will tend to cause the distributor 10 to collapse, or buckle. Avoidance of buckling is aided by increasing stiffness. In order to enhance the stiffness, the sections 12 may include a top flanged section 16, a bottom flanged section 18, and one or more vertical flanged sections 20. Flanged sections 16, 18, 20 may define a periphery of a vertical section 24, and may stiffen the flow permitting section, so that it does not collapse. Alternative means of stiffening may be applied, such as reinforcing ribs, thickened metal or composite sections, sections free of perforation, etc.

In FIG. 1, the flanged section 18 defines a gap 80 between the vessel pressure boundary and the flow permitting surface. This gap allows accumulated liquid material which arises inside the vessel (on the side of the flow permitting surface towards the vessel) to flow without pooling or being trapped in crevices, as would form if the flow permitting surfaces abutted or were joined to the vessel pressure boundary. Because the pressure vessel surface is concave locally where the nozzle penetrates the wall, this feature is particularly advantageous when the nozzle is arranged so that gravity assists in the draining of any accumulated liquids, such as when the nozzle is arranged to enter the bottom head of a cylindrical pressure vessel. In one embodiment, the gap between the flow permitting surface and the pressure vessel boundary is chosen to be comparable in dimension to the apertures in the flow permitting surface. In that way, this gap also does not permit particles of a certain size to travel between the pressure vessel and the nozzle. Other dimensions may be chosen, such as based on the surface tension of the liquids present, the control of the annular flow shape, etc.

The distributor apparatus may be rolled or processed through press-brake work from perforated plate and have a dished or flat lid (two surfaces.) It may be deep-drawn (i.e. like a cookpot) and have one surface. In essence, the distributor has at least one flow permitting surface, supported by at least one structural support. The distributor thus constituted reduces flow variation to +/−5% of the mean flow velocity in less than 5 to 10 nozzle dimensions downstream of the nozzle, or aperture, through the primary pressure-retaining surface of the vessel. In one embodiment, the flow distribution assembly does not trap accumulated fluids between itself and the adjacent surface of the pressure vessel, and therefore permits free draining of coalesced liquids into the nozzle or aperture, so that they may be removed by fluid shear and/or gravity alone or in combination. Such removal may be continuous or intermittent in time.

The flow permitting means and structural support may be of the same material, or different material than each other and the pressure vessel.

The flow permitting sections may be removably connected to the structural support in a manner which transfers load, but which also permits removal. Exemplary means of attachment are resistant to corrosion, cyclic pressure and/or temperature induced loading, and are removable. Examples are threaded fasteners, rivets, safety wire, welding, brazing, soldering and adhesive bonding. If the means of attachment are metallic, in one embodiment they are galvanically-noble with respect to one or both of the flow permitting and structural means. In another embodiment they are galvanically neutral. In another embodiment, the fastening means is arranged such that it is galvanically-isolated from the components, as by provision of polymer washers and sleeves in the case of bolts. In another embodiment, the fasteners and parts secured are arranged so that fluids may drain away from the assembly, such as by draining through perforations in perforated plate.

Figure 8:
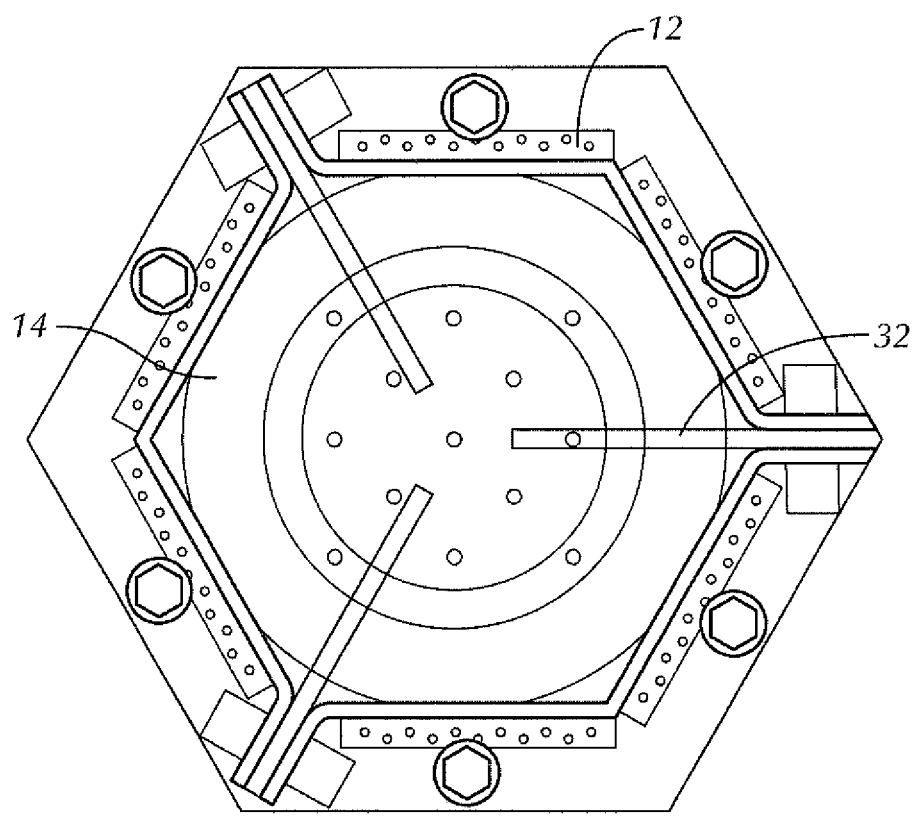
FIG. 8 is a top view of a distributor apparatus according to embodiments herein.

The at least one flow permitting sections 12 may be connected at respective vertical flanged sections 20 to form a hexagonal, octagonal, or cylindrical structure. Other cylinder-like structures having three or more sides may also be used. Likewise, the general surfaces described need not be orthoganol to each other, such that the distributor 10 may assume the shape of a frustrum of a cone, or other, more complex geometric bodies of revolution. To facilitate connection, the two or more perforated plate sections 12 may be curved or bent. For example, as illustrated in FIG. 1, the distributor may include four perforated plate sections 12, each having an internal bend angle 30 of 135 degrees, and the vertical flanged sections 20 may be configured to be connected at an internal bend angle of 135 degrees, resulting in a regular octagonal structure. As illustrated in FIG. 8, the distributor may include three perforated plate sections 12, each having an internal bend angle of 120 degrees, and the flanged sections may be configured to be connected at a 120 degree internal bend angle, resulting in a regular hexagonal structure.

The two or more perforated plate sections 12 may be connected via connections 28, such as welds, at one or more locations along the respective vertical flanged sections 20. In some embodiments, the welds may be grindable such that the sections or portions of a section may be replaced without the need to replace the entirety of the distributor. In some embodiments, the two or more perforated plate sections may be connected via at least one of bolts, screws, or other types of connections known in the art. While such connections may be used, the possibility of loosening and corrosion may limit the desirability of such connections. In one embodiment, the fasteners may be provided with sparingly-removable features, such as thread locking sealant, polymer locking zones in one or more of the male and/or female portions of threaded components, safety wire or cotter pins, or mechanical locking features such as "stover nuts" or "lock washers." Similarly, upper perforated plate section 14 may be connected to the top flanged section 16 of the two or more perforated plate sections 12, such as via bolts 25, as illustrated, welds, or other connections as known in the art.

Figure 3:
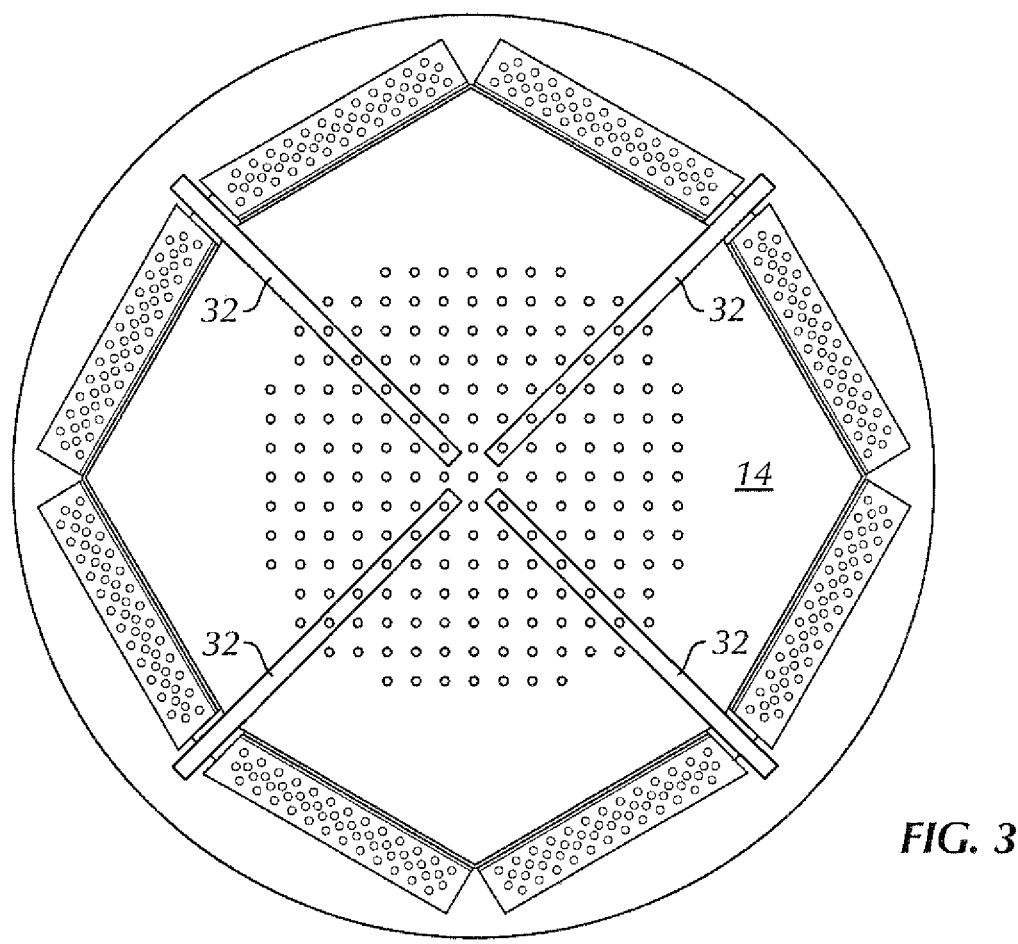
FIG. 3 is a top view of a distributor apparatus according to embodiments herein.
Figure 5:
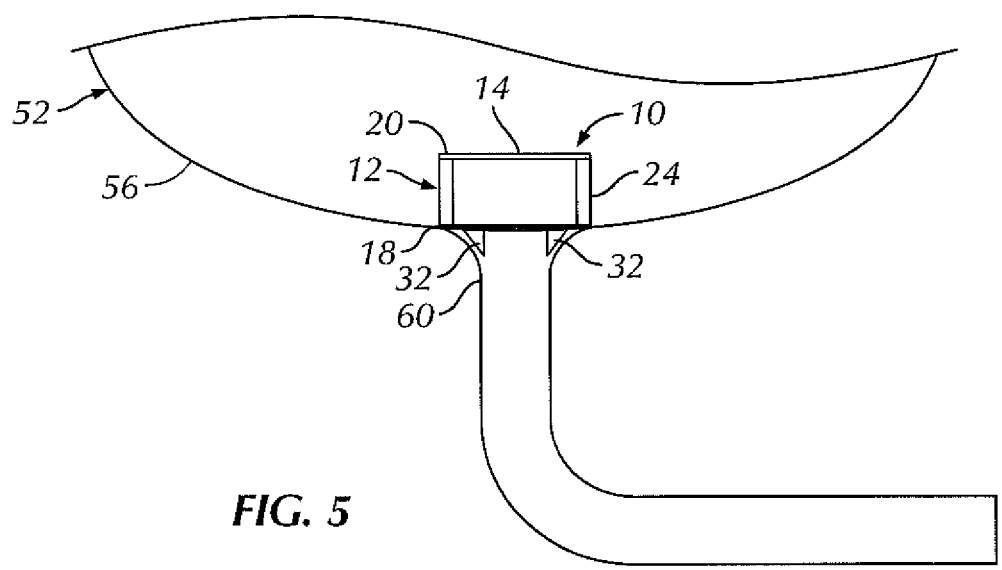
FIG. 5 is a schematic view of an adsorption system including a distribution apparatus according to embodiments herein.
Figure 6:
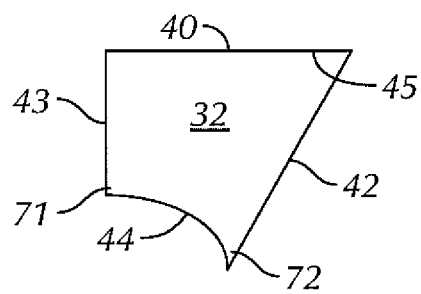
FIG. 6 is a cross sectional view of a structural support fin useful in distributor apparatus according to embodiments herein.

The mechanical loads borne by the distributor 10 must be transferred to a point of support. Prior art distributors have generally been attached to the pressure boundary of the pressure vessel at the general location of the flow permitting surface. Because of the desirability of sufficient stiffness to resist collapse, this assemblage is mechanically stiff, and connection of the surface to the vessel restrains the surface of the vessel from moving. This fact gives rise to high localized mechanical stress, which causes a tendency for one or more of the pressure vessel boundary or the flow permitting surface to crack. In the distributor 10, structural support of the flow permitting surface is effected in a way which does not increase the stress in the primary pressure vessel wall to a value which would cause failure by low cycle fatigue. For example, the stresses may be controlled to a level at or below the values in Section VIII, division 2 of the ASME pressure vessel code. In one embodiment, the distributor includes at least one structural support fin 32 disposed between the connected vertical flanged sections 20. The structural support fin 32 may be provided to allow for proper placement of the device within a vessel and transfer of the loads applied to the distributor 10 during use. For example, as illustrated in FIGS. 1, 3 and 5, the structural support fins 32 may extend radially inward toward the center of the distributor structure. As illustrated more clearly in FIG. 6, fin 32 may include a top 40, an interior side 42, an exterior side 43, centralizer portion 44. Centralizer portion 44 may be configured to extend below the bottom flanged sections 18 of the distributor 10 into a bottom head feed/effluent nozzle 60 of a vessel 52 (as shown in FIG. 5) and to centralize the lower distributor with respect to the bottom head feed/effluent nozzle 60, as will be illustrated and described further below.

Top surface 40 of structural support fins 32 may be configured to engage a bottom surface of the upper perforated plate section 14, providing structural support to the upper perforated plate section. The load of the weight of adsorbent materials above the distributor 10 may thus be distributed to the remainder of the distributor structure via connection with flanged sections 20 and to the vessel where the centralizer portion 44 and flanged sections 20 may be joined to the pressure vessel boundary. In one embodiment of the distributor, the points of mechanical attachment are less than ½ nozzle diameter from the edge of the axial projection of the nozzle aperture diameter. In another embodiment, these points of mechanical attachment are less than ¼ nozzle diameters from the axial projection of the diameter. The means of attachment may be configured so at to minimize the creation of localized stresses in the vessel itself, such as by providing a relief cut in the structural support fin between the point of joining the fin to the pressure boundary and the flow permitting surface. The junction between the structural support fin and the point of attachment may be smoothed, such as by applying a fillet weld, or a thickened and shaped section in the structural support fin abutting the point of attachment.

Structural support fins 32, in some embodiments, may also be configured to provide the desired angling and connectivity between perforated plate sections 12. The number of structural support fins used may depend on the number of sections 12 used in forming the distributor structure. For example, a hexagonal structure formed from three sections 12, such as illustrated in FIG. 8, may include three fins 32; likewise, an octagonal structure formed from four sections 12 may include four fins 32. Structures having more or less sections 12 may include a greater or less number of fins 32. Fins may also be used in less than all of the connections between the sections 12; for example, for an octagonal structure using eight sections 12, four fins 32 may be provided to result in the desired centering and structural properties. The fins may be unitary or separate in construction; for example, the fins 32 may join in the center of the distributor 10, in some embodiments, or may be independent of each other in other embodiments, as illustrated in FIG. 3.

The angle 45 between the top surface 40 and the interior side 42 of fin 32 may depend upon the configuration of the fins 32, unitary or independent, structural support considerations, and the depth to which the fins are designed to extend into the nozzle 60, among other factors. In some embodiments, angle 45 may be in the range from about 15 degrees to about 90 degrees; such as in the range from about 30 degrees to about 75 degrees in other embodiments.

The distributor apparatus 10 discussed above may be used to distribute flow rapidly within a packed bed contained within a vessel that has elliptical or hemispherical end closures at the lower inlet/outlet of the vessel. For example, the distributor apparatus 10 may be used within a pressure swing adsorption system or a temperature swing adsorption system for distributing flow of vapors into an adsorption medium contained within the vessel.

Figure 7:
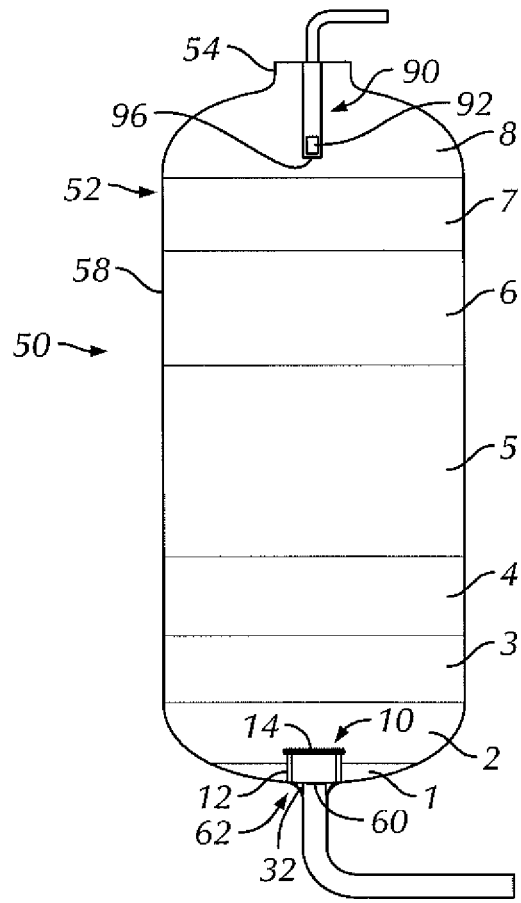
FIG. 7 is a schematic view of a lower portion of an adsorption system including a distribution apparatus according to embodiments herein.

Referring now to FIG. 7, a pressure swing adsorption system or temperature swing adsorption system according to embodiments herein is illustrated, where like numerals represent like parts. Adsorption system 50 may include a vessel 52 having a top head 54, a bottom head 56, and a cylindrical region 58 therebetween. The top and bottom heads 54, 56 may be hemispherical or elliptical and each may include a feed/effluent nozzle 58, 60, respectively, that may be located proximate a central axis of the vessel.

One or more layers of an adsorption medium (not shown) may be disposed in the vessel, such as to facilitate separation of gases during use of the adsorption system 50. The adsorption media may not be chosen to fill the entire empty space in the vessel, and inactive materials may be located at one or more locations within the vessel. Examples of such material include materials intended to physically-support the adsorbent materials such as ceramic balls, rings, cloverleafs or other shapes as known in the art. It is further known to employ different sizes of materials at different localities inside the vessel, for instance to inhibit fluidization by the flowing fluid over the media, or to prevent gross migration of the media. As illustrated in FIG. 7, the vessel may include various sections 1-8, and the type, particle size, and adsorptive capacity of the adsorption medium or other particles disposed within the sections may vary. Adsorption medium used are typically approximately spherical or cylindrical in nature and as supplied include a range of particle sizes. The particle size distribution of the adsorption medium may range from a low end of about 1 mm, 1.5 mm, 2 mm, 2.5 mm, 3 mm, or 5 mm up to a high end of 5 mm or 10 mm. Preferred adsorption media that may be placed in a layer in the vessel in contact with distributors 10 disclosed herein have a particle size $D_{10}$ typically greater than about 1.5 mm or 2 mm ($D_{10}$ defining the size for which only 10% of the particles in the distribution have a diameter less than the noted size).

In one embodiment, the material placed adjacent to the distributor 10 is substantially larger than the mean particle size employed within the adsorber. For instance, the media adjacent to the distributor may have a dimension greater than 3 mm. In a further embodiment, a yet coarser layer 1 (FIG. 7) of media is arranged in a layer that radially-surrounds the distributor 10. The depth of this layer may be chosen to be approximately the same depth or less as the projection, or height, of the distributor 10 into the vessel. In another embodiment, this layer 1 is greater than the height, but less than twice the height. The mean diameter of the particles in this layer 1 may be chosen to be between 3 mm and 50 mm, depending on the geometry of other layers provided within the vessel. In one embodiment, a layer 2 of progressively less coarse material is provided directly above layer 1. This layer 2 may be adjacent to the distributor 10, or may be separated from the distributor by layer 1 or some other material, such as a flow permitting separator barrier, which may be a mesh, foam, felt, wool, etc. The particle size of layer 2 is between that of layer 1 and the other layers in the vessel. In one embodiment, the diameter of the particles in layer 2 is between 15% and 90% of the particle diameter of layer 1.

Likewise, the particle diameter in the next adjacent layer 3 may be chosen to be progressively smaller than that in layer 2. Alternatively, a further separation barrier such as a mesh, foam, felt, wool, etc. may be placed between layer 2 and layer 3. In fact, the boundary between each layer may be accompanied by a barrier layer, or the materials may directly contact one another, and the choice to employ such separation barriers does not limit the present invention in any way.

A lower distributor, such as a distributor 10, may be disposed within the vessel. As disposed, distributor 10 may encompass an aperture 60 connecting to the bottom head 56 through a nozzle 62. As in one embodiment described above, the lower distributor 10 may include at least one perforated plate sections 12 and an upper perforated plate section 14. The perforated plate sections 12 may include a top flanged section 16, a bottom flanged section 18, and two vertical flanged sections 20 defining a periphery of a vertical section 24. Upper perforated plate section 14 may be connected to the top flanged section 16 of the two or more perforated plate sections 12.

Figure 2:
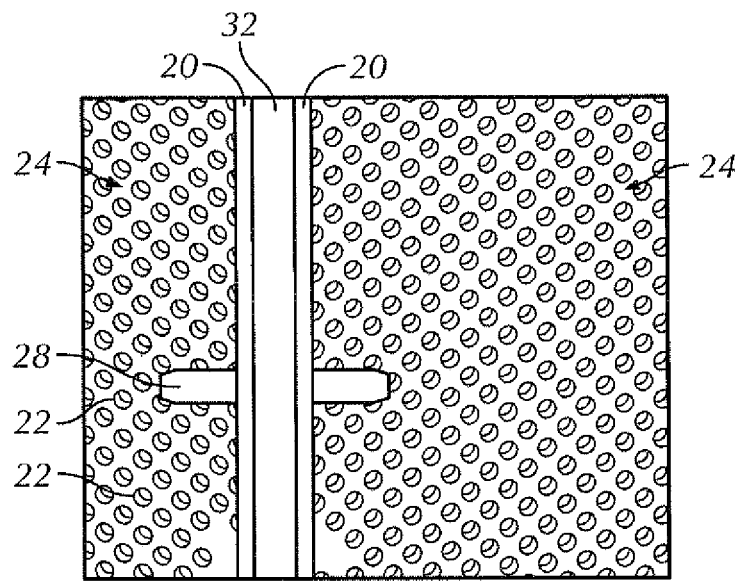
FIG. 2 is a schematic view of a portion of a distributor apparatus according to embodiments disclosed herein
Figure 4:
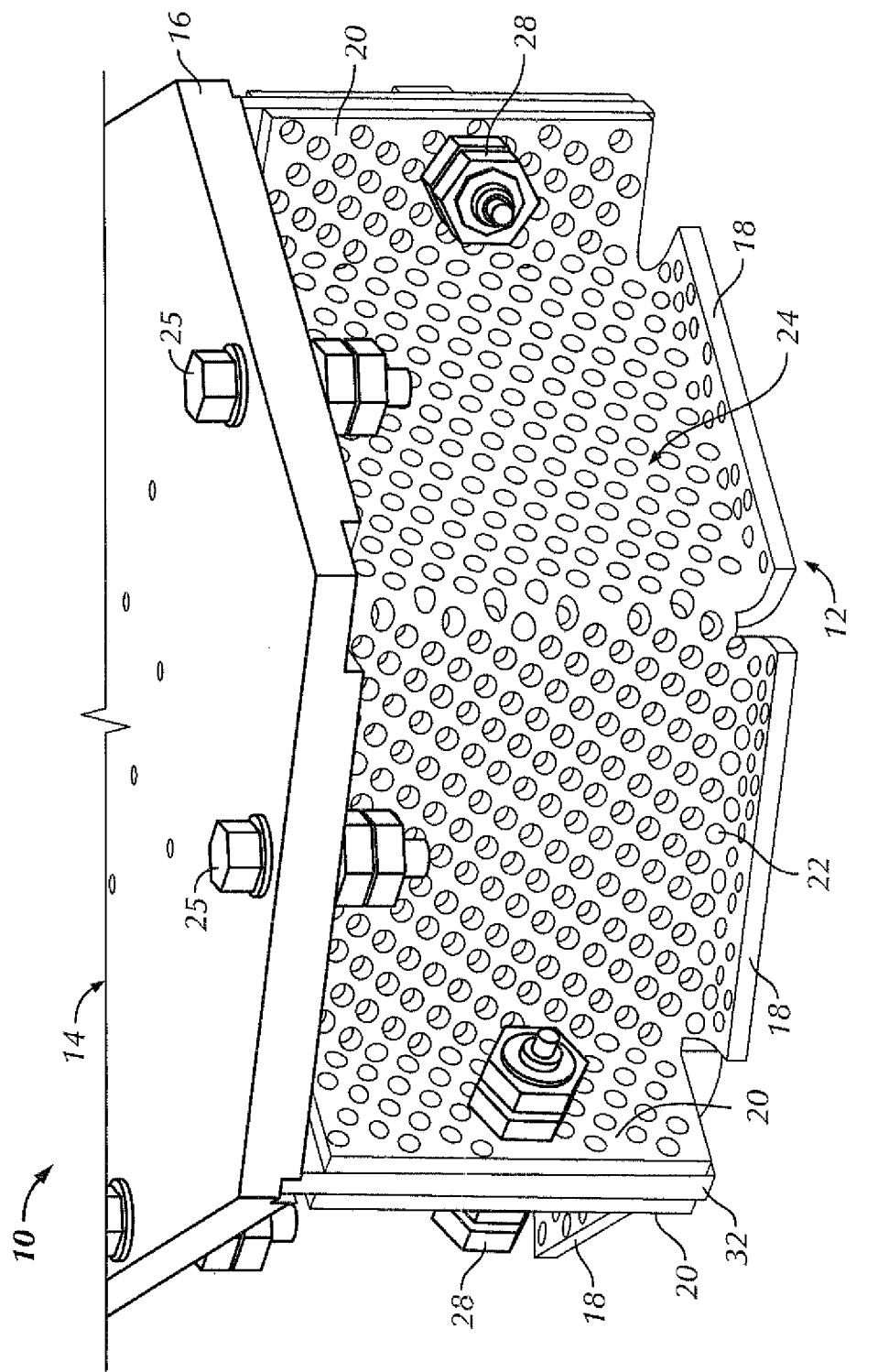
FIG. 4 is another profile view of a distributor apparatus according to embodiments disclosed herein.

To provide for proper flow through the distributor 10, as well as to retain the adsorption medium within the vessel 52, a diameter of perforations 22 (as illustrated in FIGS. 2 and 4, for example) through the two or more perforated plate sections 12 and the upper perforated plate section 14 may be less than a diameter of the adsorption medium. The distributor may include perforations 22 large enough to resist clogging by dust and debris having a diameter of less than 1 mm, but are also sufficiently fine that the adsorption medium does not pass through the distributor. In some embodiments, the perforations 22 may have a diameter in the range from about 1 mm to about 4 mm, such as 3 mm, 3.5 mm, 4 mm, or any size therebetween.

Lower distributor 10 may include a structural support fin 32 disposed between the connected vertical flanged sections 20. As described above, and as illustrated in FIGS. 5 and 6, the structural support fins 32 are configured to extend below the bottom flanged sections 18 into the bottom head feed/effluent nozzle 62 and to transfer load from the lower distributor 10 to the bottom head feed/effluent nozzle 62. As can be seen from the figure, the fin 32 is not attached to the head 56, or vessel pressure boundary, more than half the diameter of the aperture 60 beyond the projection of the aperture along its axis. The external surface 44 of the extension of the fins 32 may progress smoothly from a highest point 71 to a lowermost point 72, such as an arced extension of the fin, or may be discrete linear sections progressing from a highest point to a lowermost point. The fin may be joined to the nozzle 62, such as by welding or other means as noted above. The fin may transfer loads from distributor 10 to the flow nozzle, but without restraining the head 56, as this causes high localized stresses.

Figure 9:
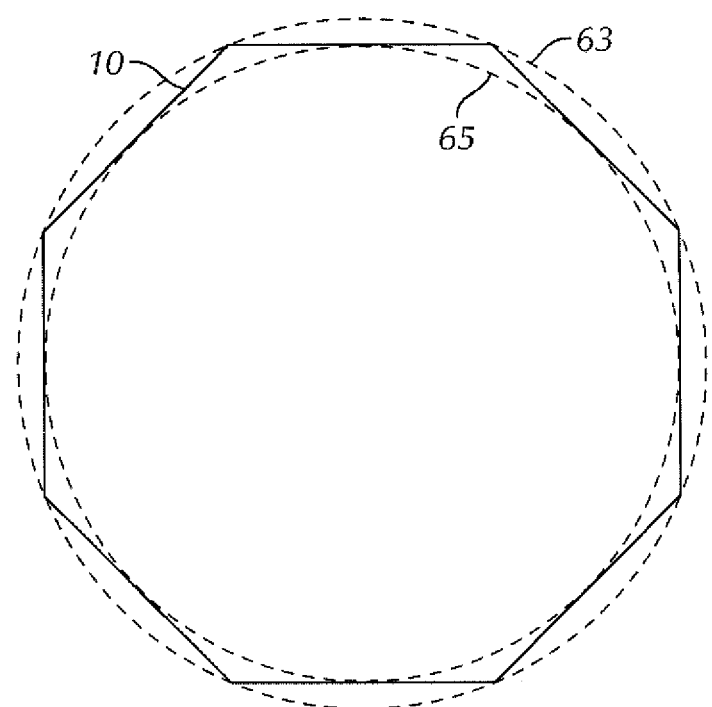
FIGS. 9 and 10 illustrate portions of distributor apparatus and vessels.

As noted above, the two or more perforated plate sections 12 may be connected at respective vertical flanged sections 20 to form a hexagonal, octagonal, or other cylindrical structures. The structure thus formed may have an average external diameter greater than an internal diameter 63 of the lower head feed/effluent nozzle 60 proximate an interior of the bottom head 56. As used herein, average diameter of a non-circular distributor structure, such as a hexagon, is defined as the average of the maximal external diameter 63 (of a circle arcing from vertex to vertex) and the minimal external diameter 65 (plane to plane), as illustrated in FIG. 9. External is defined herein as in relation to the outermost edge or surface of the bottom flange.

Figure 10:
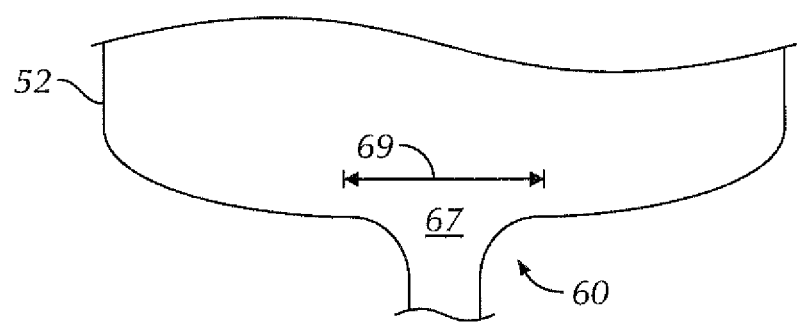

In some embodiments, the maximal external diameter 63 is greater than the internal diameter 67 of the lower head feed/ effluent nozzle 60. The minimal external diameter 65 may be greater or less than the internal diameter 67 of nozzle 60. Nozzle 60 may be tapered with respect to bottom head 56, and as the bottom head may be elliptical or hemispherical in shape, the internal surface of the bottom head may not be flat, such as illustrated in FIG. 10

The maximal and minimal diameters 63, 65 may be selected such that a gap 80 is formed between portions of the bottom flanged sections 18 of the two or more perforated plate sections 12 and an inner surface of the bottom head 56 of the vessel proximate nozzle 60, as illustrated in FIG. 1. The dimensions of the gap between the bottom head and the lower distributor should be selected such that the distributor retains the adsorption medium in the vessel while providing flow area for liquid to drain from the vessel through the bottom head feed/effluent nozzle 60. The opening or hole 67 permits flow between nozzle 60 and vessel 52. The nozzle itself encompasses a zone 69 near the hole 67 which is reinforced. Embodiments herein use a novel nozzle, which slopes towards the aperture (hole) so that liquid drains from the vessel 52 into nozzle 60. The nozzle 60 may be formed from the head 56, such as by spinning or forging, or it may be a separate piece that is cast, forged or machined from plate, castings or forgings. The nozzle may be welded in place to form part of the vessel, but may also be brazed, soldered, etc. The gap between the flow permitting surface 12 and the nozzle 62 along with the slope or curve of the nozzle 62 combine to permit free and rapid draining of liquids. The flow area may thus prevent any significant accumulation of liquids in the bottom of the vessel on and around the distributor.

The lower distributor 10 thus provides three paths through which fluid may pass through the distributor, either from the nozzle into the vessel or from the vessel out to the nozzle, including through perforations in the upper plate 14, perforations in the vertical section 24, and through the gap 80 formed between the vessel and the distributor 10. In some embodiments, the distributor 10 may be configured to provide: from 75 to 99% or 100% of a mass flow normal to the axis of the nozzle; and from 0% or 1% to 25% of the mass flow parallel to the axis of the nozzle. In other embodiments, the distributor 10 may be configured to provide: from 90 to 99% or 100% of a mass flow normal to the axis of the nozzle; and from 0% or 1% to 10% of the mass flow parallel to the axis of the nozzle. In other embodiments, the distributor 10 may be configured to provide: from 75 to 95% % of a mass flow through the flow permitting surface(s) of the distributor, and from 5% to 25% of the mass flow through the gap. The relative proportion of flow passing through the gap and through the flow permitting surface which is perpendicular to the axis of the nozzle may be freely-selected by altering the relative geometry of these components.

In some embodiments, the distributor 10 may be configured to provide: from 0% or 1% to 25% of a mass flow through the horizontal perforated plate section; from 50% to 95% of the mass flow through the vertical section; and from 5% to 25% of the mass flow through the gap; wherein the ranges add up to 100%, based on total mass flow passing from the bottom head feed/effluent nozzle to an interior of the vessel for contact with the adsorption medium or vice versa. In other embodiments, the distributor 10 may be configured to provide: from 0% or 1% to 10% of a mass flow through the horizontal perforated plate section; from 70% to 90% of the mass flow through the vertical section; and from 10% to 20% of the mass flow through the gap.

One variable that may be used to affect the amount of flow through the top plate 14 is the total flow permitting area (such as the number of perforations). In some embodiments, such as illustrated in FIGS. 1 and 3, only a central portion of the plate may include flow permitting features (perforations). In other embodiments, the entirety of top plate 14 may include flow permitting features. In still other embodiments, the top plate may have a concentration of perforations in the central region of the plate with rings of perforations radially spaced outward from the central region. The location and number of perforations may depend on strength requirements of the top plate and the desired diffusion pattern resulting from flow through the top plate and vertical sections 24, among other variables. Thus, in some embodiments, the flow permitting area may cover the entire surface of top plate 14, or may be chosen to cover only a portion thereof. In one embodiment, the flow permitting area is in a central region only, where the diameter of the central region may be 25% to 90% of the diameter of the top plate 14.

The lower distributor 10 may be configured to provide uniform flow within the vessel within a few inlet nozzle diameters. For example, the flow may have a uniformity index (as defined below) may be greater than 0.9 within 5 inlet nozzle diameters downstream of the nozzle; may be 0.93 or greater within 6 or 7 inlet nozzle diameters in other embodiments; and may be 0.95 or greater within 8 to 10 inlet nozzle diameters in yet other embodiments. In comparison, jets introduced into a vessel without a distributor may persist for 20 inlet nozzle diameters.

The lower distributor 10 may be configured to provide an upward flow of vapors within the vessel that is within 5% of the axial bulk flow direction when the flow passes from the bottom head 56 to the cylindrical region 58 (passing from the curved section to the straight section). In some embodiments, such as for a vessel having a bottom head that is approximately 0.75 m in height, the lower distributor 10 may be configured to provide an upward flow of vapors within the vessel that is within 10% of the axial bulk flow direction at a height of 0.5 m above the lower distributor and within 1.5% of the axial bulk flow direction at a height of 1 m above the lower distributor when passing a vapor from the bottom head to the top head.

The relative amount of flow that passes through the top plate 14 relative to perforated plate sections 12 may impact how rapidly the uniformity of flow is achieved as well as the overall usage of adsorbent materials located in the bottom portions of the vessel, especially near the outer portions of the bottom head 56. A ratio of the number of perforations in top plate 14 to the total number of perforations for the distributor 10 structure may be in the range from about 1:5 to about 1:20, such as in the range from about 1:8 to about 1:16, providing for a majority of the perforations being on sections 12 and a greater quantity of the flow being dispersed radially as opposed to axially through the top plates.

As mentioned above, the distributor 10 must be a relatively strong structure. The thickness of the material used to form top plate 14, sections 12, and fins 32 should be selected to provide adequate strength to the structure to bear the weight of the adsorbents within the vessel, but must also be selected so as to have some resilience/flexibility to accommodate potentially rapid changes in pressure as well as flow direction that may be encountered during use. Pressure drop through the perforations may also impact material thicknesses desired. The width of bottom flanged sections 18, top flanged sections 16, and vertical flanged sections 20 should also be selected with these requirements in consideration.

The overall height of sections 12 may also be selected based on the desired flow permitting area ratio as well as the required strength and flexibility of the structure. In some embodiments, the height of section 12 may be roughly equivalent to an average diameter of top plate 14. In other embodiments, the height of sections 12 may be less than an average diameter of top plate 14. For example, a ratio of the height of sections 12 to an average diameter of top plate 14 may be in the range from about 0.1:1 to about 1:1 in some embodiments; in the range from about 0.2:1 to about 0.8:1 in other embodiments; and in the range from about 0.25:1 to about 0.5:1 in yet other embodiments. In other embodiments, a ratio of the height of sections 12 to the inside diameter of nozzle 60 may be in the range from about 0.5:1 to about 5:1, such as in the range from about 0.75:1 to about 1.5:1.

Referring again to FIG. 7, the adsorption system 50 may also include an upper distributor 90 disposed in the vessel proximate the top head 54 feed/effluent nozzle 58. Upper distributor 90 may include a flow permitting cylindrical flow conduit 92 in fluid communication with the top head feed/effluent nozzle 58. The flow permitting area may be provided via holes, slots or other open areas. For example, holes may be perforated (punched), laser or water jet cut, machined, etc. Alternatively, the flow permitting area may be constructed of materials such as sintered metal, metal foam, wire mesh or a composite as previously described.

Figure 11:
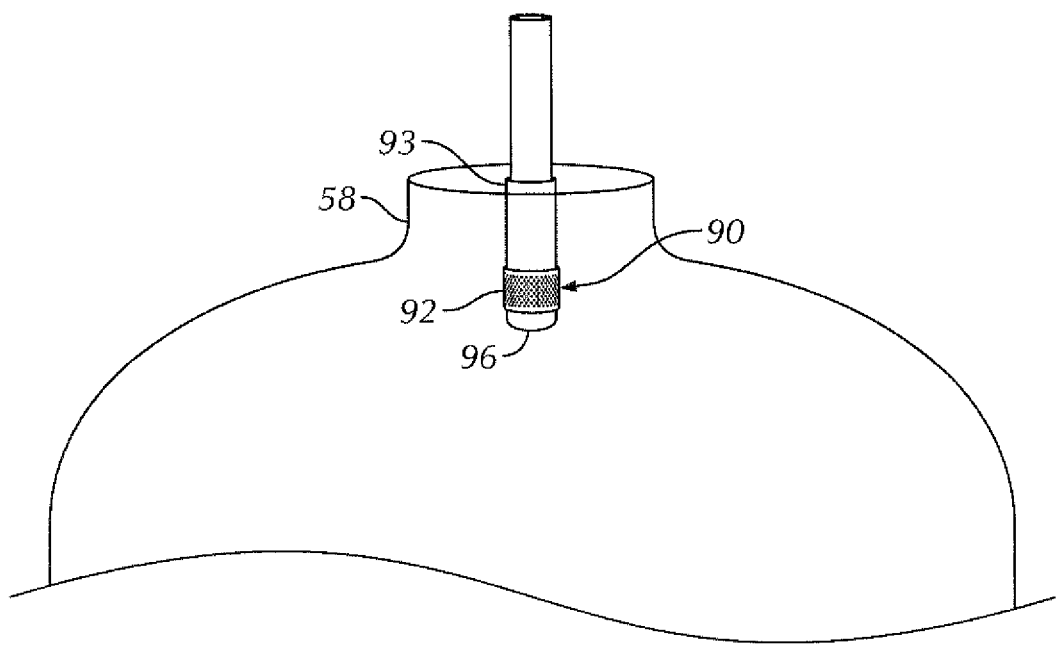
FIG. 11 is a schematic view of an upper portion of an adsorption system including a distribution apparatus according to embodiments herein.

As illustrated in FIGS. 7 and 11, the upper distributor 90 may include a vertical pipe section 93 extending through top head feed/effluent nozzle 58. Flanges or other design aspects of top head nozzle 58 may be appropriately selected to provide for disposal of pipe section 93 annularly through nozzle 58.

Figure 12:
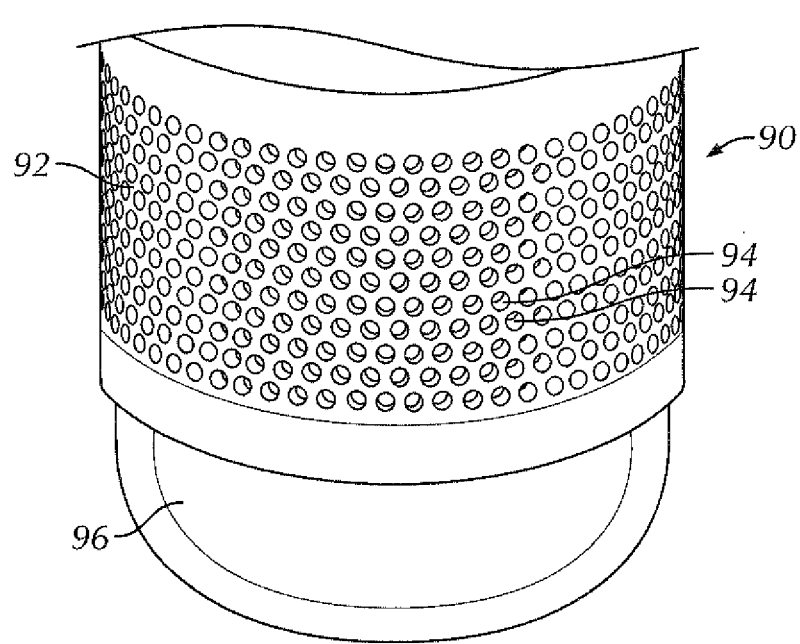
FIG. 12 is a profile view of a distributor apparatus according to embodiments herein.
Figure 13:
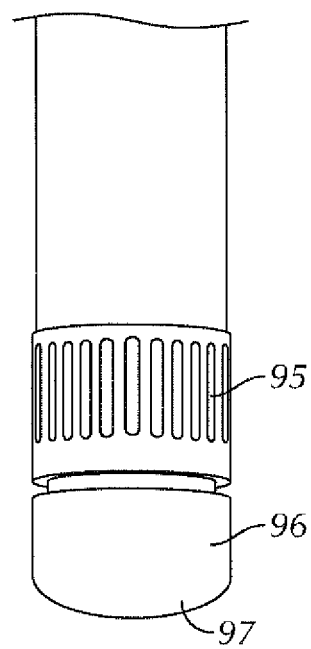
FIG. 13 is a side profile view of a distribution apparatus located in an upper portion of an adsorption system according to embodiments herein.

Dispersal of flow through upper distributor 90 may be provided via perforations 94, such as illustrated in FIG. 12, provided along a portion of flow conduit 92. The diameter of perforations 94 in the perforated cylindrical flow conduit 92 may be selected in a manner similar to that as used in the bottom head, as discussed in detail above, and in some embodiments may be in the range from about 1 mm to about 3 mm. In other embodiments, such as illustrated in FIG. 13, dispersal of flow through upper distributor 90 may be provided via elongated slots 95 that may have a width selected to limit plugging and avoid flow of the adsorption medium through the slots. The flow permitting region may also be made by other means, such as sintered metal, foam, permeable polymer, etc.

Upper distributor 90 may further include a lower cap section 96, which may or may not include one or more perforations 97 (FIG. 13). Perforations 97, when present may provide flow area for liquid to drain from the upper distributor 90 into the vessel, as well as to provide a vertical flow component to or from the vessel to effect the desired flow distribution/uniformity of flow when the upper distributor 90 is used as an effluent nozzle and an inlet nozzle.

The relative length of perforated section 92 as well as the location of perforated section 92 within the vessel should be selected so as to allow flow into pipe section 93 without significantly disturbing the overall uniformity of flow within vessel 52. Further, the relative amounts of perforations in section 92 versus cap 96 may be selected using similar considerations as described above with respect to lower distributor 10.

In some embodiments, upper distributor 90 may be of unitary constructions. For example, holes may be drilled in a section of pipe which may subsequently be capped via a permanent welded connection. In other embodiments, it may be desirable to have upper distributor 90 fabricated in a manner such that portions of the distributor are easily replaceable. For example, the upper distributor may be formed in three discrete sections, including a pipe section 93, a perforate section 92, and a cap section 96, where each may be connected via threaded connections or small welds, such as fillet or groove welds.

Embodiments of distributors disclosed herein may be used, for example, to distribute flow rapidly within an adsorption system. The adsorption system may include a packed bed within a vessel having elliptical or hemispherical end closures at the inlet and outlet of the vessel, and which, during cyclic adsorption operations, may operate at high pressure in one direction, then is purged at low pressure in the opposite direction. Cyclic adsorption processes are described in, for example, US20130042754, U.S. Pat. Nos. 6,755,895, 6,858,065, 7,674,319, and 6,755,895, among others.

In some embodiments, flow from the inlet nozzle through the lower distributors disclosed herein may have a pressure drop of less than 1 psi; less than 0.1 psi in other embodiments; less than 0.01 psi in other embodiments, and less than 0.005 psi in yet other embodiments, based on a flow rate of a methane/nitrogen mixture of about 1.2 kg/s at a pressure of about 20 bar. In some embodiments, flow through the upper distributors disclosed herein may have a pressure drop during the purging step of less than 2 psi, 1 psi, 0.5 psi or 0.25 psi; less than 0.2 psi in other embodiments; less than 0.15 psi in other embodiments, and less than 0.1 psi in yet other embodiments, based on a flow rate of a methane/nitrogen mixture of about 1.2 kg/s at a pressure of about 20 bar. Preferably, flow through the upper and lower distributors disclosed herein may have a maximum total pressure drop during the purging step of the cyclic operations of less than 0.25 psi. Pressure drops during other portions of the cycle, such as during feed, blowdown, or other stages may be greater or less than those described above.

The distributors according to embodiments herein may resist clogging by dust or debris, such as particles having a diameter of less than about 1 mm, but are sufficiently fine such that the adsorption media retained inside the vessel cannot escape. The flow distribution may be better than +/−5% by the time the flow leaves the curved section of the vessel, i.e., the head at each end of the vessel, as the volume of adsorbent contained in the vessel is greatest in the sections of substantially the full diameter.

In the case that aerosol or gross liquid drops are present in the fluid being processed, distributor apparatus disclosed herein provide gaps or flow paths such that the liquid drops are not trapped by the distributor apparatus, as this could result in severe corrosion. Likewise, the zone at which the lower distributor apparatus interfaces with the interior surface of the pressure boundary satisfy substantially the same limitations against particle blocking and/or migration that applies to the balance of the distributor apparatus.

The distributor apparatus disclosed herein are also be able to support the particle material loaded above it, and resist collapse due both to the weight of such adsorbent, but also to high instantaneous pressure differentials engendered by rapid intentional or inadvertent opening of upstream or downstream valves controlling the flows upwards or downwards through the vessel.

Despite this physical strength, the distributor apparatus disclosed herein also does not provide restraint to the pressure boundary, avoiding any high local stresses. Such high local stresses can cause localized failure, such as fatigue cracking. Exemplary fatigue cracking is accelerated by the presence of hydrogen, as in the case of hydrogen pressure swing adsorption vessels. As distributor apparatus disclosed herein do not result in high local stresses, localized failures may be avoided. As described above, apparatus for distributing flow entering and leaving a vessel loaded with particulates may neither trap condensed phases nor create significant stresses in the pressure envelope.

The distributor apparatus disclosed herein may have very high compression strength, due to the use of relatively stiff fins that attached to the pressure boundary away from the area where flexibility is required. As such a very rigid structure may result that does not need to be intimately bound or connected to the vessel wall. The distributor apparatus creates no traps for liquid, as condensed liquid can freely flow out below the lower flange of the distributor.

Finally, the flow distributing surface of the apparatus may be renewed if damaged by corrosion or erosion, such as by loosening of bolts or grinding and re-welding attachment welds. This does not require welding on the vessel, which might then require heat treatment, which is impractical once the vessel is installed in the field. Further, the distributor does not clog due to dust or debris in the feed streams and as may be present due to dusting of the adsorbent material during manufacture, installation, and use within the vessel.

Embodiments of distributor apparatus disclosed herein may provide for one or more of the following advantages: does not cause localized regions of high stress; does not trap fluids, is resistant to collapse, even in the event of rapid downwards flow in the vessel; reduces flow variation to the desired target range before the flow enters the fully-cylindrical section of the vessel; creates low pressure drop during low pressure purging; prevents migration of adsorbent media into the piping associated with the adsorption vessel. Embodiments herein simultaneously solve the problems of mechanical collapse, flow distribution, avoidance of localized stresses, prevention of liquids accumulation, and prevention of clogging by debris. Embodiments herein also permit ease in installation, repair, and removal of the flow distributor.

EXAMPLES

Computational fluid dynamics (CFD) was used to examine the flow patterns within an adsorption system resulting from the upper and lower distributors according to embodiments disclosed herein. The CFD studies were performed using the following conditions: all porous media was treated as a laminar flow zone; the gas mixture (hydrogen and methane) was modeled as an ideal gas; flow in the inlet and outlet pipes was modeled as turbulent, using the standard k-e model; the vessel was considered to be isothermal at 313 K; porosities were defined, and both the inertial and viscous tensor were modeled as isotropic (Ergun simplification); the vessel was broken into 8 regions (reference numerals 1-8 as illustrated in FIG. 7), and methane was linearly removed from porous media disposed in regions 4-6 via a negative mass source term.

The inlet composition included 85.1 wt % methane and 14.9% hydrogen at a mass flow rate of 1.199 kg/s. The mixture was at a density of 6.4 kg/m3 and had a viscosity of $1.07 \times 10^{-5}$ Pa-s. The outlet was pure hydrogen having a pressure of 19.9 bar.

The actual geometry of one embodiment of the upper and lower distributors was used in the model. Each perforation (hole) in the distributors was discretized in the perforated plate modeling to determine pressure losses and flow relationships.

Surface uniformity θ of the flow entering each region of the vessel was calculated using the velocity magnitude scalar φ based on the following equation:

$$\theta = 1 - \frac{\sum_f |\varphi_f - \overline{\varphi}| A_f}{2|\overline{\varphi}| \sum_f A_f}$$

where $\overline{\varphi}$ is the surface average of φ, $\varphi_f$ is the face value of the velocity scalar, and $A_f$ is the area of a face. The uniformity index describes the distribution of the velocity magnitude scalar on a surface. If the velocity is distributed equally, the resulting number is 1. Results of the surface uniformity of the CFD analyses for flow entering and exiting regions of the adsorption system (with zones defined as in FIG. 7) are presented in Table 1.

TABLE 1

| Position | Distance above entry to vessel (number of inlet nozzle diameters) | Uniformity Index (Surface Uniformity of Velocity Magnitude) |
|---|---|---|
| Leaving the lower distributor | 1.01 | 0.74 |
| Entering first porous media | 2.34 | 0.71 |
| Entering second porous media | 6.32 | 0.93 |
| Entering third porous media | 9.32 | 0.95 |
| Entering fourth porous media | 19.26 | 0.94 |
| Entering fifth porous media | 22.27 | 0.88 |
| Entering free space | 24.27 | 0.88 |

Surface uniformity of the flow leaving the distributor is 0.74, suggesting that the distributor works well. By the time the flow enters the second porous media region, the surface uniformity increases to 0.93, and flow is nearly uniform where the preponderance of the active adsorption occurs (zones 4-6).

Flow through the bottom distributor may be affected by upstream bends in piping. For example, more flow may leave one section of the top perforated plate than others as a result of turbulence and eddying that may be introduced by the bend; similar flow maldistributions may also be introduced into the vertical sections 12 of distributor 10. In some embodiments, the location and/or number of perforations in the top plate may be selected based on upstream flow considerations. In other embodiments, fins 32 may be designed and placement of the fins (orientation of distributor 10) within the inlet may be selected so as to result in more uniform flow through the top plate to account for the upstream perturbations.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system, comprising:
a vessel comprising a top head and a bottom head;
a bottom head feed/effluent nozzle;
a lower distributor having at least one flow permitting surface disposed within the vessel and encompassing an inlet of the bottom head feed/effluent nozzle; and
a flow gap between a bottom portion of the lower distributor and the bottom head feed/effluent nozzle;
wherein the lower distributor is disposed within the vessel to provide the flow gap having dimensions sufficient to permit a liquid to drain from the vessel into the bottom head feed/effluent nozzle and to retain a solid medium disposed within the vessel proximate the lower distributor.

2. The system of claim 1, wherein the at least one flow permitting surface is configured to distribute at least a portion of a flow of gases in a direction normal to an axis of the bottom head feed/effluent nozzle.

3. The system of claim 2, wherein the at least one flow permitting surface is configured to distribute at least a portion of a flow of gases in a direction parallel to the axis of the bottom head feed/effluent nozzle.

4. The system of claim 1, wherein the lower distributor further comprises at least one structural support fins configured to extend below a lowermost edge of the flow permitting surface nearest a bottom head feed/effluent nozzle aperture.

5. The system of claim 4, wherein the at least one structural support fin is attached to the bottom head feed/effluent nozzle.

6. The system of claim 1, wherein the lower distributor is configured to provide 75% to 100% of a mass flow normal to an axis of the bottom head feed/effluent nozzle, and from 0% to 25% of the mass flow parallel to the axis of the bottom head feed/effluent nozzle.

7. The system of claim 1, wherein the lower distributor is disposed within the vessel and configured to provide from 75% to 95% of the mass flow through the at least one flow permitting surface and from 5% to 25% of the mass flow through the flow gap.

8. The system of claim 1, further comprising:
a top head feed/effluent nozzle; and
an upper distributor disposed in the vessel proximate the top head feed/effluent nozzle.

9. The system of claim 8, wherein the upper distributor comprises a flow conduit in fluid communication with the top head feed/effluent nozzle comprising one or more flow permitting features configured to distribute at least a portion of a flow of gases in a direction normal to an axis of the top head feed/effluent nozzle.

10. A pressure swing or temperature swing adsorption system, comprising:
a vessel comprising a top head and a bottom head;
a bottom head feed/effluent nozzle;
an adsorption medium disposed in the vessel;
a lower distributor disposed within the vessel and encompassing an inlet of the bottom head feed/effluent nozzle; and
wherein the lower distributor comprises:
at least one flow permitting surface; and
at least one structural support fin removably attached to the bottom head feed/effluent nozzle.

11. The system of claim 10, wherein the structural support fins are configured to extend below a lowermost portion of the flow permitting surface nearest a bottom head feed/effluent nozzle aperture into the bottom head feed/effluent nozzle and to centralize the lower distributor with respect to the bottom head feed/effluent nozzle.

12. The system of claim 11, wherein a top of the structural support fins provides structural support to the at least one flow permitting surface.

13. The system of claim 10, wherein the lower distributor comprises:
two or more perforated plate sections, the perforated plate sections including a top flanged section, a bottom flanged section, and two vertical flanged sections defining a periphery of a vertical section;
an upper perforated plate section connected to the top flanged section of the two or more perforated plate sections.

14. The system of claim 13, wherein a diameter of perforations of the two or more perforated plate sections and the horizontal perforated plate section is less than a diameter of the adsorption medium.

15. The system of claim 13, wherein the two or more perforated plate sections are connected at respective vertical flanged sections to form a hexagonal, octagonal or cylindrical structure.

16. The system of claim 15, wherein the lower distributor has an average external diameter greater than an internal diameter of the lower head feed/effluent nozzle proximate an interior of the bottom head.

17. The system of claim 15, wherein the structural support fins are configured to extend below the bottom flanged sections into the bottom head feed/effluent nozzle and to centralize the lower distributor with respect to the bottom head feed/effluent nozzle.

18. The system of claim 17, wherein a top of the structural support fins provides structural support to the upper perforated plate section.

19. The system of claim 13, further comprising a flow gap between the bottom flanged sections of the two or more perforated plate sections and an inner surface of the bottom head of the vessel.

20. The system of claim 19, wherein dimensions of the flow gap between the bottom head and the lower distributor are configured to retain the adsorption medium in the vessel and provide flow area for liquid to drain from the vessel through the bottom head feed/effluent nozzle.

21. The system of claim 19, wherein the lower distributor is configured to provide:
from 0% to 25% of a mass flow through the horizontal perforated plate section;
from 50% to 95% of the mass flow through the vertical section; and
from 5% to 25% of the mass flow through the gap;
wherein the ranges add up to 100%, based on total mass flow passing from the bottom head feed/effluent nozzle to an interior of the vessel for contact with the adsorption medium or vice versa.

22. The system of claim 10, wherein the lower distributor is configured to provide flow in the vessel having a uniformity index of at least 0.9 within 5 bottom head feed/effluent nozzle inner diameters downstream of the nozzle.

23. The system of claim 13, wherein the lower distributor is configured to provide 75% to 99% of a mass flow normal to an axis of the bottom head feed/effluent nozzle, and from 1% to 25% of the mass flow parallel to the axis of the bottom head feed/effluent nozzle.

24. The system of claim 13, wherein the upper perforated plate section comprises a flat plate.

25. The system of claim 13, wherein the upper perforated plate section comprises one or more spherical or elliptical sections.

26. The system of claim 10, further comprising:
a top head feed/effluent nozzle; and
an upper distributor disposed in the vessel proximate the top head feed/effluent nozzle.

27. The system of claim 26, wherein the upper distributor comprises a flow conduit in fluid communication with the top head feed/effluent nozzle comprising one or more flow permitting features configured to distribute at least a portion of a flow of gases in a direction normal to an axis of the top head feed/effluent nozzle.

28. The system of claim 27, wherein the upper distributor further comprises a lower cap section that comprises one or more perforations to permit liquid to drain from the upper distributor into the vessel.

29. The system of claim 13, wherein the bottom head feed/effluent nozzle slopes toward an inlet flow aperture to drain liquid from the vessel.

30. A distributor for use in a lower head of a vessel, the distributor comprising:
   at least one flow permitting surface; and
   at least one structural support fin configured to provide structural support to the at least one flow permitting surface, to transfer load from the distributor to a vessel nozzle in which the distributor is disposed, and to removably attach to the vessel nozzle;
   wherein the distributor is configured to provide 75% to 100% of a mass flow normal to an axis of a bottom head feed/effluent nozzle of the vessel, and from 0% to 25% of the mass flow parallel to the axis of the bottom head feed/effluent nozzle.

31. A distributor for use in a lower head of a vessel, the distributor comprising:
   two or more perforated plate sections, the perforated plate sections including a top flanged section, a bottom flanged section, and two vertical flanged sections defining a periphery of a vertical section;
   an upper perforated plate section connected to the top flanged section of the two or more perforated plate sections.

32. The distributor of claim 31, further comprising a structural support fin disposed between the connected vertical flanged sections.

33. The distributor of claim 32, wherein the structural support fins are configured to extend below the bottom flanged sections into a bottom head feed/effluent nozzle of a vessel and to centralize the lower distributor with respect to the bottom head feed/effluent nozzle.

34. The distributor of claim 33, wherein a top of the structural support fins provides structural support to the upper perforated plate section.

35. A distributor for use in distributing flow into a vessel, the distributor comprising:
   a vertical section including one or more apertures permitting flow through the distributor;
   an upper plate section connected to the vertical section including one or more apertures permitting flow through the distributor;
   one or more structural support fins connected to the vertical section and the upper plate section, the structural support fins configured to provide structural support to the distributor and to transfer load from the distributor to a vessel nozzle in which the distributor is disposed;
   wherein the distributor is configured to form a flow gap between a bottom portion of the distributor and a bottom head feed/effluent nozzle of the vessel, and
   wherein the lower distributor is configured to provide from 75% to 95% of a mass flow through the one or more apertures of the vertical section and upper plate section and from 5% to 25% of the mass flow through the flow gap.

* * * * *